Feb. 15, 1927.

B. MARKOW 1,617,492

BIRDCAGE BATH

Filed April 29, 1926

Bernard Markow INVENTOR

BY

Harry Jackson ATTORNEY

Patented Feb. 15, 1927.

1,617,492

UNITED STATES PATENT OFFICE.

BERNARD MARKOW, OF BROOKLYN, NEW YORK, ASSIGNOR TO ART CAGE MANUFACTURING COMPANY, INC., OF BROOKLYN, NEW YORK, A CORPORATION OF NEW YORK.

BIRDCAGE BATH.

Application filed April 29, 1926. Serial No. 105,346.

This invention relates to birds' baths and particularly to the type adapted to be attached to a bird cage, and contemplates the provision of a simple and efficient structure whereby the bath may be produced economically from sheet material in large quantities and may be given a pleasing and ornamental appearance.

The various objects of my invention will be clear from the description which follows, and from the drawing, in which, Fig. 1 is a top plan view partly in section of my improved bath showing in dotted lines a portion of a cylindrical cage to which the bath may be attached.

Figure 1:
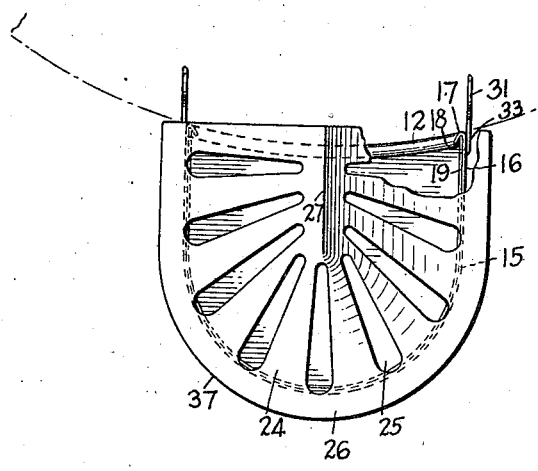
Figure 2:
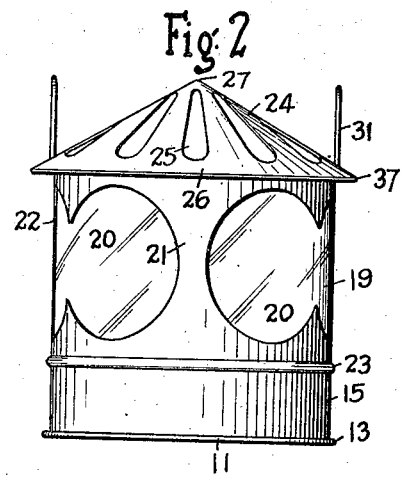
Fig. 2 is a front view of the same.
Figure 3:
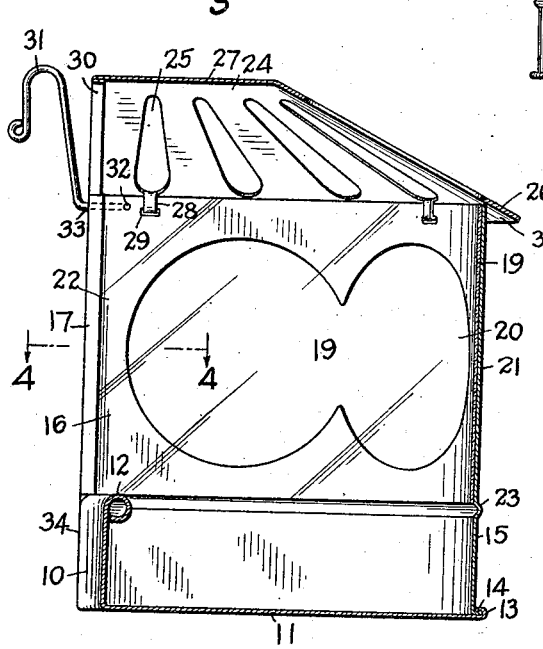
Fig. 3 is a vertical central section of the same.
Figure 4:
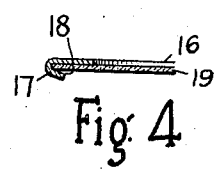
Fig. 4 is a horizontal section of a portion of the rear back wall of the bath taken on the line 4—4 of Fig. 3.

My improved bath is designed to be removably secured to round or cylindrical cages and for that reason the upstanding rear wall 10 which is made integral with the bottom 11, is given a curvature substantially that of the cage to which the bath is to be attached. The rear wall 10 extends upwardly from the bottom 11 a comparatively short distance to allow sufficient space thereabove for the entrance of the bird into the bath, and terminates at its upper edge in the perch 12 on which the bird may rest in its passage between the cage and the bath. The base or bottom 11 at its periphery is flanged as at 13 to project preferably beyond the wall 15 of the bath, and is folded over and clinched over the outstanding edge 14 of the vertical wall 15, whereby a leak proof closure is formed between the said base 11 and the wall 15. Said wall is made preferably semi-cylindrical at the front portion thereof, but terminates in substantially plane upright sides 16. At the rear extremity of the sides 16, the ends 17 thereof are bent or folded over to form the open grooves 18.

A flexible transparent sheet 19 of celluloid or similar material is used to close the openings 20 which are made in said wall 15 in such a manner that the larger portion of said wall is cut away to admit a maximum of light into the bath without making the wall too weak. In order to provide suitable braces for the wall 15, the openings 20 are spaced apart at the front central portion of said wall whereby a portion as 21 serving as a brace is left in said wall, and extends vertically throughout the entire height thereof. Similarly the openings 20 are spaced from the rear edge 17 to provide the braces 22. A bead as 23 is formed in the wall 15 horizontally throughout the width thereof at substantially the height of the perch 12 not only in order to present an ornamental appearance, but also to indicate approximately the height of the transparent member 19. In order to insert said flexible transparent member behind the openings 20, said member is bent so that the ends thereof are approximately opposite the grooves 18, the ends of said member then being preferably inserted one at a time into said grooves. Reliance is had on the tendency of the transparent member to straighten out, to force said member in place tightly against the inner surface of the wall 15. It will be understood that in order to remove the transparent member for cleaning or for any other purpose, the ends thereof are removed from the groove 18 whereupon said member may readily be taken out of the bath. The top or roof 24 is also made preferably of a single piece of sheet material and is provided with a series of long, narrow openings as 25 for the purpose of ventilation. The front portion 26 of said top is made in the form of half of a cone while the sides thereof are preferably plane and slant upwardly to meet in the ridge 27 which forms the highest part of said top. The eaves 37 project over the wall 15 a substantial distance, not only for the sake of better appearance but also to form a secure joint between said wall and said top. At certain of the perforations 25 all of the material is not removed but some is left in order to form tongues as 28 which are passed through suitable slots as 29 near the upper edge of the wall 15 and then bent over to permanently secure said top and said wall together. The rear edges 30 of said top are preferably folded over to strengthen said edges and to remove the sharp raw edge of the sheet material out of the way.

Suitable hooks as 31 preferably of round wire are provided for removably attaching my improved bath to the cage. The end 32 of each of said hooks is bent substantially at right angles and passed through a suitable hole in the upper edge of the wall 15 and the horizontal portion 33 of said hook is soldered or otherwise secured to the outside of said wall.

As hereinbefore pointed out the lower rear wall is made of the same piece of sheet material as is the base 11, the joint 34 between said wall and each of the rear edges of the wall 15 being rendered leakproof as by means of solder or the like.

It will be understood that the rear portion above the wall 10 is left entirely open for the entrance of the bird into the bath and that the bath is hung in front of the usual door or gate which is provided in cages of this type. It will be further seen that the central portion of the top is the highest part thereof so that the maximum amount of room is provided at the place where the bird most frequently is. Further it will be seen that my improved bath is constructed of only three pieces of sheet material and a transparent sheet so that it is adapted for quantity production at minimum cost for shaping and assembly. It will further be seen that the transparent member may be readily removed so that the entire bath may be cleaned with ease and that a maximum amount of light and air is provided. The curved perch 12 has substantially the same curvature as the rear wall 10 and the outside surface of the cage to which the bath is to be attached so that said perch is in close contact with the cage and there is no danger of the bird slipping in between.

It will be further understood that various changes may be made from the specific construction shown and described herein and that I do not intend to limit myself to said construction, since equivalent means may be used in place of those shown without departing from the scope of this invention and from the purview of the appended claims.

I claim:

1. A bird bath open at the back comprising a flat base and a rear wall both of a single piece of sheet material, a wall member of a single piece of sheet material bent to form continuous front and side walls, a leak-proof seamed joint between the bottom edge of said wall member and said base, a leak-proof joint between the upright edges of said rear wall and the corresponding edges of said wall member, and a peaked roof of a single piece of sheet material projecting over the upper edge of said wall member.

2. A bird bath comprising three distinct pieces of sheet metal, including one for the base and rear wall, a second for the upright wall, and a third for the roof, leak-proof joints between said base and wall pieces, and tongues projecting from said roof piece and passing through said wall piece for joining said roof piece to said wall piece.

3. A bird bath comprising a longitudinally curved rear wall, a curved perch circular in cross section at the upper extremity of said wall, a flat base of sheet material integral with said wall, a partly curved sheet of a single piece of material for the front and sides of said bath, provided with spaced openings of substantial area, to provide an upright brace at the central front and at the rear portions of said sheet, a perforated peaked top on said sheet, and a transparent flexible sheet removably covering the upper part of the inner surface of said wall sheet.

4. In a bird bath, a partly curved wall sheet of a single piece of sheet material having spaced arcuate openings therein to provide bracing sections in said sheet between the upper and lower edges of said sheet, said sections being wider at the top and bottom than at the middle thereof, a flat base of a single piece of sheet material joined to said sheet, a low rear wall upstanding from and integral with said base, a perforated top for said bath, and a flexible transparent sheet covering the openings in said curved sheet and means at the rear edges of said wall sheet for removably maintaining said transparent sheet in place.

5. In a bird bath, a wall sheet semi-cylindrical at the front thereof, terminating in flat parallel walls, and having spaced openings therein to leave sections bracing said sheet between the upper and lower sections thereof, a flexible transparent sheet covering said openings and said braces on the inside of said bath, a bottom of a single piece of sheet material, and a top of a single piece of sheet material.

6. In a bird bath, a peaked top of a single sheet of metal semi-conical at the front thereof, and wedge shaped at the rear thereof and provided with a series of long narrow openings, tongues formed in said top from the material removed from said openings, an upright wall of a single sheet of metal semi-cylindrical at the front and terminating in flat substantially parallel sides, spaced inwardly from the edge of said top and provided with slots for the reception of the tongues of said top for joining said top and wall together.

7. In a bird bath having a large rear opening therein, a low, partly cylindrical outwardly concave rear wall of predetermined curvature, a flat base integral with said wall, an upright wall member of a single piece of sheet material, a seamed leak-proof joint between the outer edge of said base and the lower edge of said wall member, a soldered joint between the upright edges of said rear wall and the rear edges of said wall member, a reentrant bend at the upper parts of the rear edges of said wall member, and a perforated peaked top for said bath of a single piece of sheet material overhanging the upper end of said wall member.

8. In a bird bath, a wall member of a single piece of sheet metal provided with openings spaced apart to provide bracing sections in said member, a reentrant bend at each of the rear ledges of said wall member, and a flexible transparent sheet having the rear edges thereof inserted into said bends and forcing itself against the inner face of said member on the attempt of said sheet to straighten for covering said openings.

9. A bird bath comprising a flat sheet metal base of a single piece of material, a rear wall integral with and upstanding from said base a comparatively short distance to provide a large rear opening in said bath above said wall, for the passage of a bird, an upright sheet metal member forming a curved front wall and parallel side walls of a single piece of material, having spaced openings therein, a leak-proof joint between said member and said base, a second leak-proof joint between the edges of said rear wall and the corresponding edges of said member, a sheet of transparent flexible material arranged on the upper portion of the inside face of said member and covering the openings therein, a forwardly bent portion on each of the rear edges of said member for engaging the rear edges of said transparent sheet and for maintaining said sheet in place, a perforated peaked top highest in the middle thereof of a single piece of sheet metal covering the upper edge of and projecting over said member, means for securing said top to said member and a perch substantially circular in cross section at the upper extremity of said rear wall, said rear wall being bent to a predetermined curvature.

BERNARD MARKOW.